(12) United States Patent
Katagiri et al.

(10) Patent No.: US 9,001,174 B2
(45) Date of Patent: Apr. 7, 2015

(54) IMAGE FORMING APPARATUS

(71) Applicant: Canon Kabushiki Kaisha, Tokyo (JP)

(72) Inventors: Shinji Katagiri, Yokohama (JP);
Masaru Shimura, Yokohama (JP);
Hideo Nanataki, Yokohama (JP);
Shinsuke Kobayashi, Yokohama (JP);
Kiyoto Toyoizumi, Susono (JP);
Yasunari Watanabe, Suntou-gun (JP);
Hideaki Hasegawa, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/781,205

(22) Filed: Feb. 28, 2013

(65) Prior Publication Data
US 2013/0235142 A1  Sep. 12, 2013

(30) Foreign Application Priority Data

Mar. 7, 2012 (JP) .................. 2012-050672
Feb. 27, 2013 (JP) .................. 2013-037362

(51) Int. Cl.
| | | |
|---|---|---|
| B41J 2/455 | (2006.01) | |
| B41J 2/45 | (2006.01) | |
| B41J 2/435 | (2006.01) | |
| B41J 2/385 | (2006.01) | |
| G03G 15/043 | (2006.01) | |
| G03G 15/00 | (2006.01) | |
| H04N 1/00 | (2006.01) | |

(52) U.S. Cl.
CPC .......... *G03G 15/043* (2013.01); *G03G 15/5025* (2013.01); *H04N 1/00* (2013.01)

(58) Field of Classification Search
USPC .................. 347/118, 233, 224, 238
See application file for complete search history.

(56) References Cited

U.S. PATENT DOCUMENTS

| | | | | |
|---|---|---|---|---|
| 5,347,298 A | * | 9/1994 | Gokita | ........................ 347/133 |
| 5,461,414 A | * | 10/1995 | Honda et al. | .................. 347/250 |
| 6,433,909 B2 | | 8/2002 | Toyoizumi et al. | .......... 359/204 |
| 6,606,470 B1 | * | 8/2003 | Wibbels et al. | ............... 399/156 |
| 2002/0054204 A1 | * | 5/2002 | Ikeda | ............................ 347/252 |
| 2010/0061750 A1 | * | 3/2010 | Okada | ............................ 399/55 |
| 2013/0142528 A1 | * | 6/2013 | Watanabe et al. | ............... 399/46 |

FOREIGN PATENT DOCUMENTS

| | | |
|---|---|---|
| JP | 09-236972 | 9/1997 |
| JP | 2001-066860 | 3/2001 |
| JP | 2003-312050 | 11/2003 |
| JP | 2006-221048 | 8/2006 |
| JP | 2011-028086 | 2/2011 |

OTHER PUBLICATIONS

U.S. Appl. No. 13/693,463, filed Dec. 4, 2012, Inventors: Yasunari Watanabe, Hideaki Hasegawa.

* cited by examiner

*Primary Examiner* — Sarah Al Hashimi
(74) *Attorney, Agent, or Firm* — Fitzpatrick, Cella, Harper & Scinto

(57) ABSTRACT

The image forming apparatus includes a photosensitive drum and a light emitting device. In the rotational axis direction of the photosensitive drum, the width of the weak light exposure region on the photosensitive drum in which an exposing device emits weak light is larger than the width of a region corresponding to the width of a recording medium on which an image is formed, but smaller than the width of a region on the photosensitive drum charged by a charging roller.

19 Claims, 10 Drawing Sheets

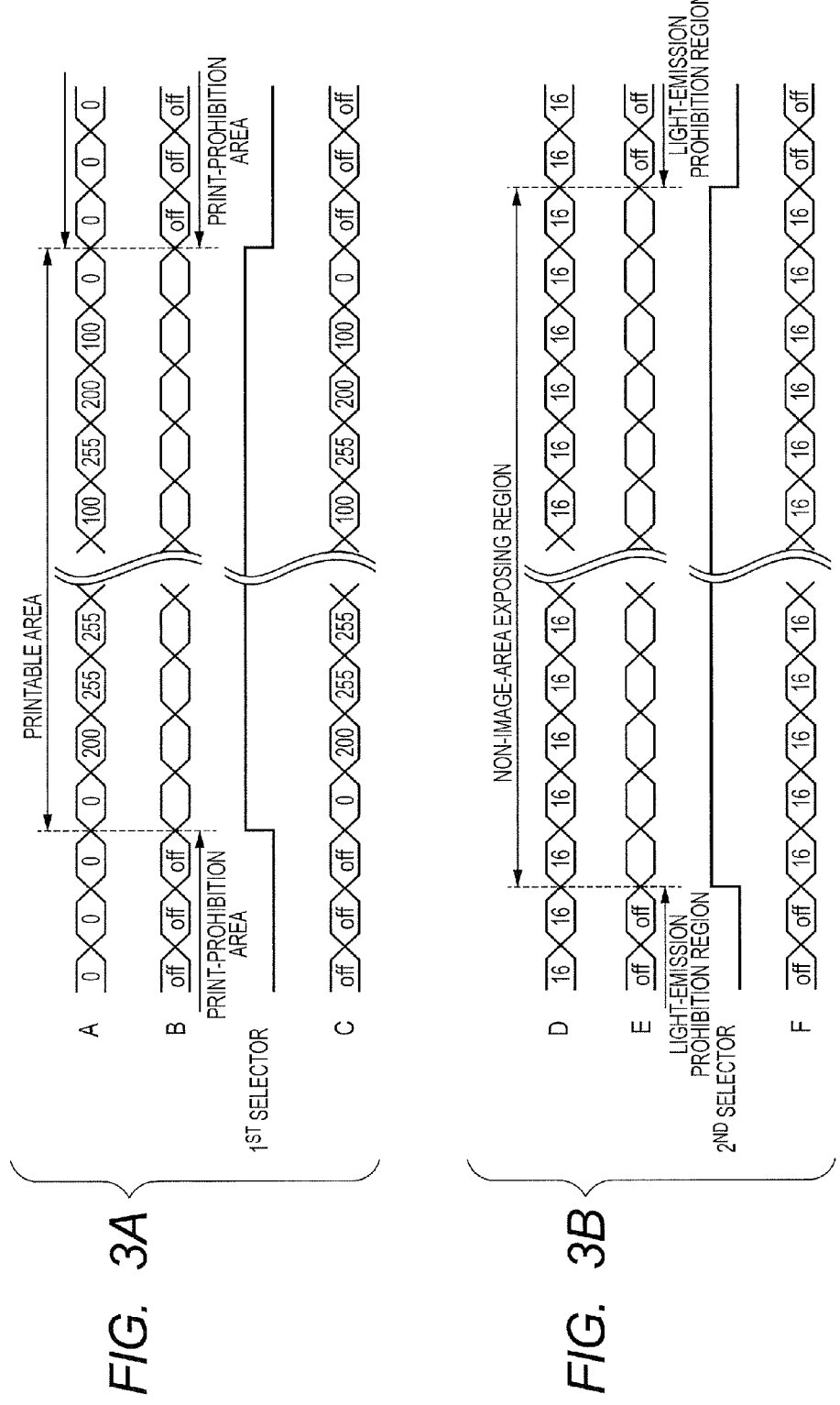

IMAGE FORMING APPARATUS

BACKGROUND OF THE INVENTION

1. Field of the Invention

The present invention relates to an image forming apparatus using an electrophotography recording scheme, such as a laser printer, a copier and a facsimile machine.

2. Description of the Related Art

Some electrophotography image forming apparatuses employ a method of repeating multiple times a process of transferring, onto a recording sheet, a toner image having been formed on an image carrier by charging, exposing and developing, thereby forming an image in which multiple colors are overlapped with each other on the recording sheet to acquire a color image. In such a color image forming apparatus, a phenomenon occurs where a gap of white that should not exist is formed between adjacent different colors of images. This is because, when a latent image with abrupt change in drum surface potential, e.g. an image edge portion, is formed on the photosensitive drum, a developing device develops the area such that a visualized image is formed narrowly in comparison with the electrostatic latent image originally formed on a photosensitive drum. In the case of monochrome image formation, there is no adjacent color. Accordingly, a possible narrowing to a certain extent, which may occur in an image, causes no problem. However, image formation in such a state causes the following phenomenon. For instance, in the case of an image where a cyan band and a black band are adjacent to each other, each of a cyan visualized image and a black visualized image is narrowly formed; the image is to be formed such that the cyan band and the black band are adjacent to each other with no gap. Accordingly, a finally transferred image on a sheet unfortunately has a gap between a cyan part and a black part. Such a phenomenon will hereinafter be called a white gap.

FIG. 10A is a diagram illustrating a white gap according to a conventional technique in detail. A phenomenon where a visualized image (visualized area) is narrowed occurs because the electric field is wrapped at edge areas of an electrostatic latent image (latent image area) formed on a photosensitive drum 1a as illustrated in the diagram. Japanese Patent Application Laid-Open No. 2003-312050 discloses a technique that is called non-image-area exposure and, in an image forming unit, a light emitting element of a laser scanner is caused to emit weak light with a small light amount onto the entire surface of a printable region to an extent preventing redundant toner from adhering, thereby preventing an image from being narrowed. More specifically, a method is employed that is called a pulse width modulation (PWM) scheme and changes the duty ratio of a pulse wave. This scheme causes the light emitting element of the laser scanner to emit light with a pulse having a very short pulse width corresponding to an emission amount of weak light.

The non-image-area exposure as described above is employed not only for measures against a white gap but also for stabilizing (properly adjusting) the voltage of the surface of a charged photosensitive drum 1a to suppress an image failure in a printable region.

However, in the configuration of the conventional image forming apparatus, a non-image-area exposure region irradiated with weak light intensity is the same as a printable region. Accordingly, a phenomenon sometimes occurs where toner adheres to a place in a sheet edge area not to be developed. Such a phenomenon is called fogging. Referring to FIGS. 10B and 10C, specific description will be made. Conventionally, a signal for weak light intensity emission for non-image-area exposure is processed as with an image signal. That is, a signal for driving a laser diode is subjected to pulse width modulation to adjust laser emission time. Accordingly, as illustrated in FIG. 10B, in the longitudinal direction (laser main scanning direction) that is the rotational axis direction of a photosensitive drum, which is an image carrier, in terms of a light emission region, a printable region (image-area exposure region) where a laser is on for printing is the same as a non-image-area exposure region where the laser is emits as weak emit light with a small light amount. In both the longitudinal direction (main scanning direction) (longitudinal position) and the sheet conveying direction (sub-scanning direction), a part with a prescribed distance apart from a sheet edge is regarded as a print-prohibition region. The printable region is thus set smaller than an actual sheet size to prevent an image from protruding from the actual sheet size. That is, a margin is set as a print-prohibition region.

Accordingly, as illustrated in FIG. 10B, in the case where the printable region is the same as the non-image-area exposure region, the following occurs. That is, the absolute value of the charged voltage (called a photosensitive drum voltage) (Vd) (illustrated with no non-image-area exposure) on the surface of the photosensitive drum in a print-prohibition region provided outside the printable region is larger than the absolute value of the photosensitive drum voltage of the non-image-area exposure region (Vdbg) (illustrated with non-image-area exposure). Accordingly, in the print-prohibition region, a background contrast Vback (=|Vd|−|Vdc|), which is the contrast between a developing voltage Vdc and a photosensitive drum voltage Vd, is unfortunately larger than the printable region (here, Vback=|Vdbg|−|Vdc|). Thus, in the print-prohibition region, fogging (reversed fogging) occurs owing to toner (reversed toner) charged in a polarity reversed to the original polarity.

The reason will be described below. As illustrated in FIG. 10C, the photosensitive drum voltage (Vd) is set relatively high in consideration of the variation in the exposure area voltage (VL). Repetitive image forming operations (sheet feeding) successively expose the photosensitive drum to cause residual charge. Accordingly, in a state after feeding sheet, the VL voltage is increased (VL UP) in comparison with the initial state. The relative high setting is made for addressing the increase. Thus, the developing voltage (Vdc) is controlled such that the developing contrast Vcont (=|Vdc|−|VL|) is maintained constant to compensate increase in exposure area voltage (VL) of the photosensitive drum, thereby preventing the density of the image from varying. Meanwhile, even under such control of the developing voltage maintaining the developing contrast (Vcont), if the initial photosensitive drum voltage (Vd) is constant, the background contrast (Vback) after feeding sheet is unfortunately reduced. To address the reduction, the initial photosensitive drum voltage (Vd) is preset relatively higher, the non-image-area exposure is performed on the non-image-area exposure region to reduce the voltage of the photosensitive drum from a value Vd to an appropriate value Vdbg. Accordingly, the optimal background contrast (Vback) is maintained, thereby preventing fogging from occurring. However, the photosensitive drum voltage (Vd) on a region without non-image-area exposure becomes excessive, and reversed fogging tends to easily occur. Particularly, in this phenomenon, the laser is caused to always emit light in the case of non-image exposure. Accordingly, the VL voltage tends to significantly increase. In a high temperature and high humidity environment, the photosensitive drum voltage (Vd) is high and the toner charge is low. Accordingly, fogging tends to easily occur.

To reduce fogging, weak light with a small light amount exposure on the entire charged region may be considered. However, the weak light exposure with a small light amount on the entire charged region unfortunately increases laser emission time, and causes a possibility of reducing the life of the laser.

SUMMARY OF THE INVENTION

Thus, in view of the problem, it is an object to reduce laser light emission time, and suppress occurrence of fogging in sheet edge areas.

Further features of the present invention will become apparent from the following description of exemplary embodiments with reference to the attached drawings.

BRIEF DESCRIPTION OF THE DRAWINGS

FIGS. 3A, 3B and 3C are timing charts illustrating control of the non-image-area exposure of Embodiment 1.

DESCRIPTION OF THE EMBODIMENTS

Preferred embodiments of the present invention will now be described in detail in accordance with the accompanying drawings.

Aspects of the present invention will be described in detail with reference to embodiments.

Embodiment 1

Figure 1:
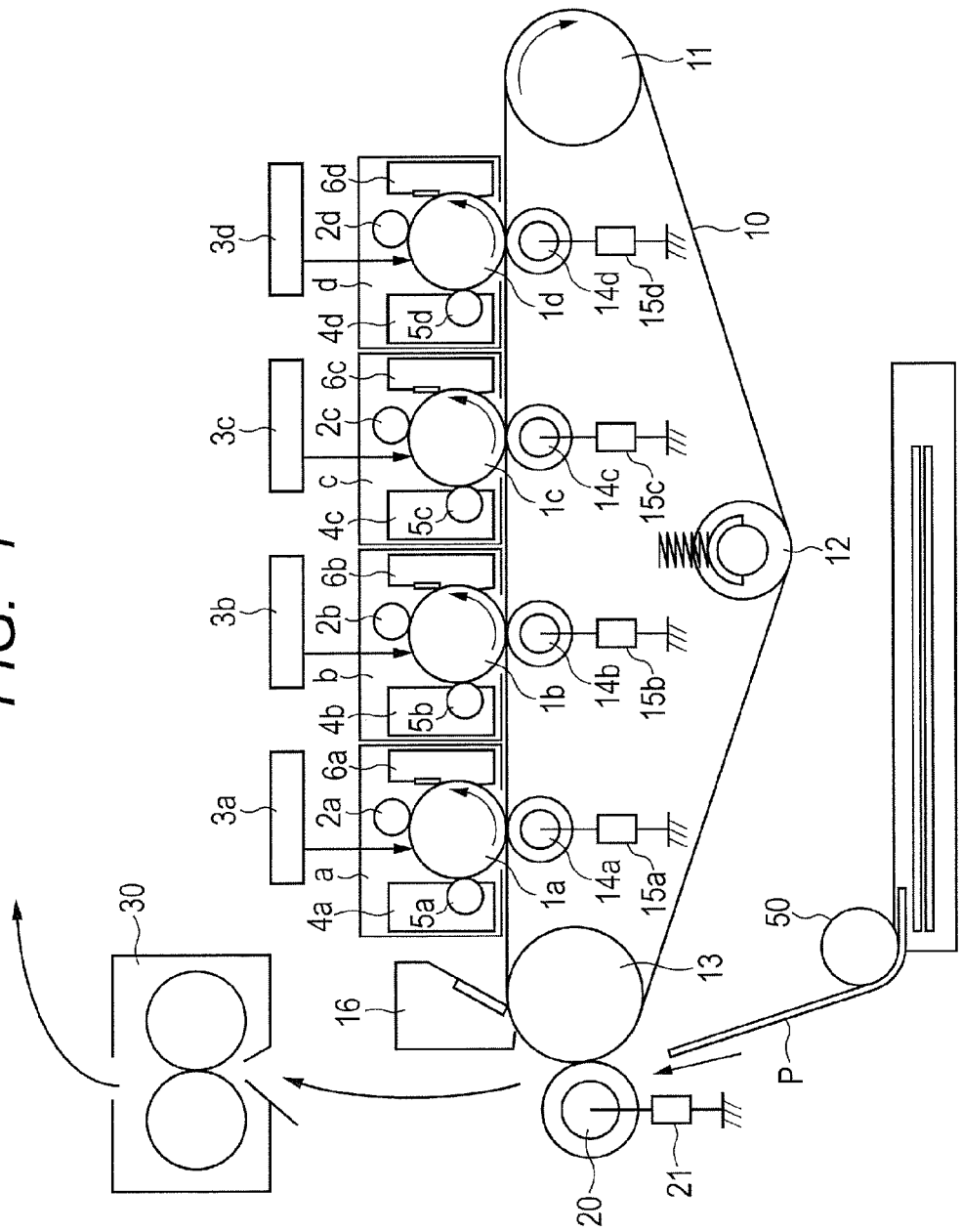
FIG. 1 is a diagram illustrating an image forming apparatus of Embodiment 1.

FIG. 1 is a schematic diagram of a color image forming apparatus. Referring to FIG. 1, the configuration and operation of the image forming apparatus of Embodiment 1 will be described. The image forming apparatus of this embodiment includes first to fourth image forming stations. The first image station (subscript a) is for yellow (Y). The second image station (subscript b) is for magenta (M). The third image station (subscript c) is for cyan (C). The fourth image station (subscript d) is for black (Bk). The subscripts a to d are omitted unless necessary. In this specification, the image forming operation will be described with reference to the first station (Y), which is employed as a typical example.

(Operation of Image Forming Apparatus)

The image forming apparatus includes an electrophotography photosensitive member (hereinafter, called a photosensitive drum) 1 having a drum shape. The photosensitive drum 1 is rotatably driven in the direction of an arrow (counterclockwise direction) at a prescribed circumferential velocity (process speed). In this rotation process, the photosensitive drum 1a is uniformly charged to prescribed polarity and voltage by a charging roller 2a. After being charged, the drum is subjected to image exposure by an exposing device 3a. Thus, an electrostatic latent image corresponding to a yellow color component image of a target color image is formed. Subsequently, the electrostatic latent image is developed at a developing position by a developing roller 5a disposed in a first developing device (yellow developing device) 4a to thereby be visualized as a yellow toner image.

An intermediate transfer belt 10 (intermediate transfer member) is stretched across stretching members 11, and 13, and rotatably driven in the same direction (clockwise direction) moving at an opposite area in contact with the photosensitive drum 1 at a circumferential velocity substantially identical to that of the photosensitive drum 1. A yellow toner image formed on the photosensitive drum 1a (on the photosensitive member) is transferred onto the intermediate transfer belt 10 by a primary transfer roller 14a in a process of passing through a contact part (hereinafter, called a primary transfer nip) between the photosensitive drum 1a and the intermediate transfer belt 10. The process is hereinafter called primary transfer. A primary transfer power source 15a applies a primary transfer voltage onto the primary transfer roller 14a. Residual toner on the surface of the photosensitive drum 1 (hereinafter, called primary transfer residual toner) is cleaned and removed by a cleaner 6a and subsequently subjected to image forming processes including a charging process and processes thereafter.

Hereinafter, likewise, a magenta toner image with the second color, a cyan toner image with the third color, and a black toner image with the fourth color are formed, and sequentially transferred on the intermediate transfer belt 10 in an overlapping manner, thereby acquiring a synthesized color image corresponding to the target color image.

The toner image with four colors on the intermediate transfer belt 10 is comprehensively transferred by a secondary transfer roller 20 onto a surface of a recording medium P fed by a feed roller 50 in a process of passing through a contact part (hereinafter, called a secondary transfer nip) between the intermediate transfer belt 10 and the secondary transfer roller 20. This process is hereinafter called secondary transfer. A secondary transfer power source 21 applies a secondary transfer voltage onto the secondary transfer roller 20. Subsequently, the recording medium P carrying the toner image with four colors is conveyed to a fixing unit 30, where the medium is heated and pressed. Accordingly, the toner with four colors are melted and mixed, and fixed on the recording medium P. The above operation thus forms a full-color print image on the recording medium P. The residual toner on the surface of the intermediate transfer belt 10 after the secondary transfer (hereinafter, called secondary transfer residual toner) is cleaned and removed by an intermediate transfer belt cleaner 16.

(Configuration of Image Forming Unit)

The configuration of the image forming unit of this embodiment will be described. The photosensitive drum 1a is rotatably driven by the driving force of a drive motor, which is a drive unit (drive source) but not illustrated, in the direction of the illustrated arrow (counterclockwise direction) according to the image forming operation. The photosensitive drum 1a serving as the center of the image forming process is an organic photosensitive drum where an undercoat layer as a functional film, a carrier generating layer and a carrier transfer layer are formed by sequential coating on the circumferential surface of an aluminum cylinder. The exposing device 3a, which is an exposure area, causes a laser scanner to emit laser light onto the photosensitive drum 1a and selectively irradiates the surface of the photosensitive drum 1a, thereby forming an electrostatic latent image. The laser scanner forms an electrostatic latent image by driving a light emitting element, such as a laser diode, to emit laser light according to exposure time processed by a data correction unit 38a, which is a data controller and will be described later.

The charging roller 2a as a charging device is an elastic charging roller including a core metal and an elastic layer thereon, and pressed against the photosensitive drum 1a to come into contact therewith, thereby being driven to rotate. Here, in a charging process, a prescribed direct current voltage is applied to the core metal of the charging roller 2a with respect to the photosensitive drum 1a. Accordingly, a uniform dark voltage (Vd) is formed on the surface of the photosensitive drum 1a. The photosensitive drum 1a is exposed to a spot pattern of laser light emitted from the exposing device 3a according to an image data. The exposed site loses charges on the surface by carriers from the carrier generating layer. Accordingly, the voltage is reduced. As a result, an electrostatic latent image is formed on the photosensitive drum 1a. In this image, exposure sites have a prescribed bright voltage (VL) and non-exposure sites have a prescribed dark voltage (Vd).

The developing roller 5a as a developing device is an elastic developing roller including a core metal and an elastic layer thereon. The developing roller 5a and the photosensitive drum 1a rotate such that the respective surfaces move in the same direction (vertical direction pointing down in this embodiment) at the opposite areas (contact areas). In this embodiment, the developing roller 5a is disposed in contact with the photosensitive drum 1a. However, the developing roller 5a may be disposed adjacent to the photosensitive drum 1a at a prescribed interval. In a developing process, a prescribed direct current voltage is applied to the core metal of the developing roller 5a. Negatively-triboelectrically-charged toner is transferred only to bright voltage areas in a developing portion in contact with the photosensitive drum 1a, owing to the voltage difference, thereby visualizing the electrostatic latent image. The toner used is non-magnetic single component toner. This embodiment employs a reversal developing system that transfers toner onto exposed areas.

Characteristics of this Embodiment

Figure 2A:
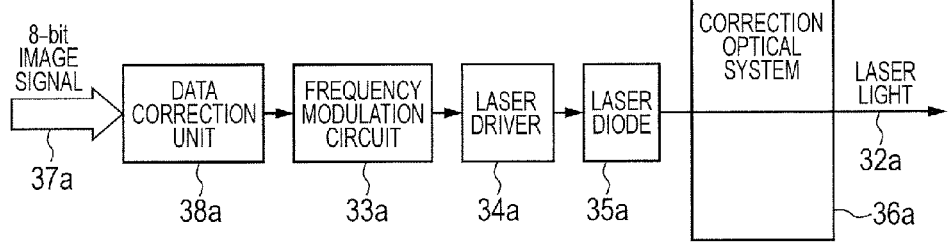
FIGS. 2A and 2B are block diagrams illustrating laser control of non-image-area exposure of Embodiment 1.

Next, control of non-image-area exposure, which is characteristics of this embodiment, will be described. FIG. 2A illustrates one example of non-image-area exposure by causing the exposing device 3a to emit weak light with a small light amount to an extent so as not to adhere toner to the non-image areas (areas not to be developed with toner) of the photosensitive drum 1a. In the following description, exposure on the photosensitive drum 1a by the exposing device 3a is exemplified. The other exposing devices 3b, 3c and 3d also have the same configuration as that of the exposing device 3a, and expose the respective photosensitive drums 1b, 1c and 1d in an analogous manner.

In FIG. 2A, an image signal 37a output from a video controller, not illustrated, is for instance a multi-valued signal (0 to 255) having 8 bits, i.e. 256 gradations in the depth direction. When the image signal 37a is 0, the laser light is off. When the signal is 255, the light is completely on. When the signal is any value of 1 to 254, the signal is an intermediate value therebetween. This signal is converted by the data correction unit 38a, described later, into an image signal with which the data for non-image-area exposure is overlapped. Furthermore, the signal is converted by a frequency modulation circuit 33a into a serial signal in the time direction. In this embodiment, the signal is used for pulse width modulation on each dot pulse having a resolution of 600 dot/inch. More specifically, according to this signal, the laser driver 34a (laser drive unit) is driven to cause a laser diode 35a (light emitting device) to emit light. The laser exposure light (hereinafter, simply referred to as laser light) 32a passes through a correction optical system 36a including a polygon mirror and serves as scanning light, with which the photosensitive drum 1a is irradiated. The data correction unit 38a and the frequency modulation circuit 33a may be apart from the laser driver 34a and provided on a side of the video controller instead.

(Control of Data Correction Unit)

Figure 2B:
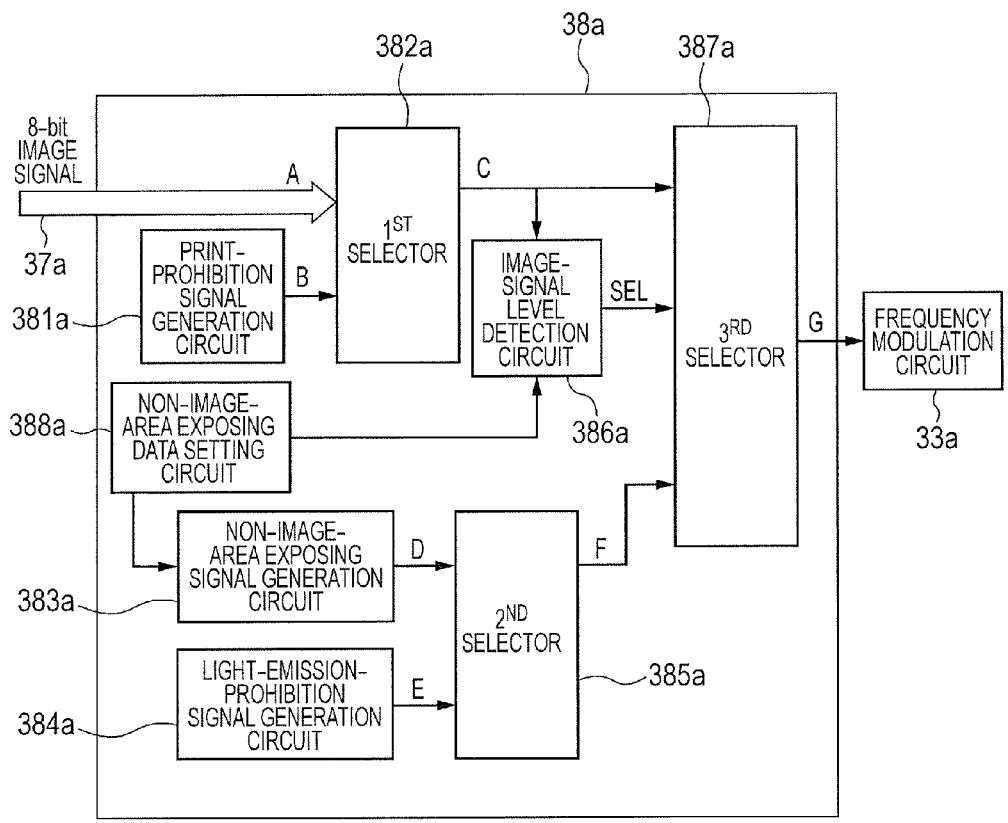
Figure 3C:
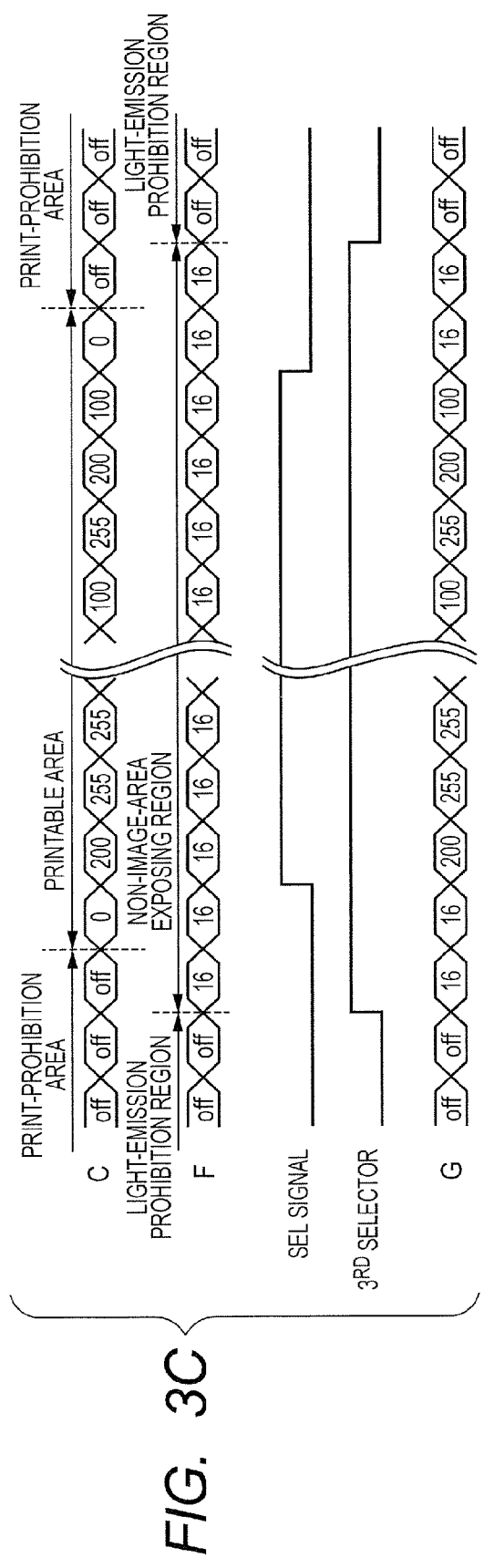

Next, referring to a block diagram illustrated in FIG. 2B and timing charts illustrated in FIGS. 3A, 3B and 3C, control of data correction unit 38a for non-image-area exposure will be described in detail. In the diagrams, a first selector 382a generates an image-area exposing data C. A second selector 385a generates a non-image-area exposing data F. A third selector 387a generates an output data G in which the image-area exposing data C and the non-image-area exposing data F are synthesized. Here, the image-area exposing data C is for causing the laser diode 35a to emit light at a light intensity of a light emission level (first light emission level) for normal printing that allows toner to adhere to the photosensitive drum 1a (normal light emission). Meanwhile, the non-image-area exposing data F is for causing the laser diode 35a to emit light at a light intensity of a light emission level (second light emission level) for weak light emission with a small light amount so as not to adhere toner to the photosensitive drum 1a (weak light emission).

In the case of reversal developing according to which image exposure is performed by the exposing device 3a to form a latent image on the photosensitive drum 1a and then the latent image is developed by the developing device 4a to form a toner image, the more the total amount of exposure on a unit area of the surface of the photosensitive drum 1a, the more easily the toner adheres. Accordingly, a total light emission amount per unit time from the laser diode 35a at the first light emission level is higher than that at the second light emission level (higher in light emission intensity).

The 8-bit image signal A (the image signal 37a in FIG. 2A) output from the video controller and the print-prohibition signal B generated by the print-prohibition signal generation circuit 381a are input into an input end of the first selector 382a. The print-prohibition signal B is for setting inner areas within a prescribed distance from the respective sheet edges as print-prohibition regions, in both the rotational axis direction (main scanning direction) of the photosensitive drum 1a and the sheet conveying direction (sub-scanning direction), according to a designated sheet size. That is, an area (central part of a sheet) inside of the print-prohibition regions is the printable region. Thus, the image size is smaller than the actual sheet size, thereby preventing the image from protruding from the sheet. The print-prohibition region at each edge is normally set inner from the sheet edge by 3 to 5 mm in consideration of sheet conveyance characteristics. In this embodiment, for instance, when an A4-sized sheet (210 mm×297 mm) is designated, the print-prohibition regions are set such that the printable region is 204 mm×291 mm. A value for setting how distant the print-prohibition regions are from the respective edges of the sheet is preliminarily stored in, for instance, a memory, which is not illustrated. The first selector 382a generates the image-area exposing data C for exposing an area on the surface of the photosensitive drum 1a to be developed with toner, based on the input image signal A and the print-prohibition signal B. The rotational axis direction of the photosensitive drum 1a is the direction of the normal to the sheet of FIG. 1. Likewise, the rotational axis directions of the other photosensitive drums 1b, 1c are 1d are analogously defined.

As illustrated in FIG. 3A, when the first selector 382a detects the off signal of the print-prohibition signal B, this selector generates the image-area exposing data C as the off signal irrespective of the value of the image signal A, and outputs the data. In contrast, when the print-prohibition signal B is not the off signal, the first selector 382a outputs the image signal A as the image-area exposing data C. Regions of the image-area exposing data C that are not the off signal, for instance, data regions of the image-area exposing data C of 0 and 200 are the printable region. Meanwhile, regions of the image-area exposing data C that are the off signal are the print-prohibition region.

The non-image-area exposing signal D generated by the non-image-area exposing signal generation circuit 383a and the light-emission-prohibition signal E generated by the light-emission-prohibition signal generation circuit 384a are input into an input end of the second selector 385a. The light-emission-prohibition signal E is for determining the non-image-area exposure region (weak light exposure region), and set according to the size of a designated sheet (on which an image is formed). More specifically, the signal is for setting, as the non-image-area exposure regions, regions wider than the width of the designated sheet size by a prescribed distance (e.g., in the main scanning direction and the sub-scanning direction, the region 3 mm-wider from the sheet edges) in the rotational axis direction (main scanning direction) of the photosensitive drum 1a and the sheet conveying direction (sub-scanning direction), and also setting regions outside thereof as the light-emission-prohibition regions. Meanwhile, the width of the non-image-area exposure region in the main scanning direction is set so as to be smaller than the width of the charged region (the widths of portions of the photosensitive drums (1a to d) corresponding to the respective charging rollers 2a to d in contact therewith), regardless of the sheet size. The video controller outputs information (hereinafter, called sheet size information) on the size of the recording medium P, such as the sheet width and the sheet length of the recording medium P, to the data correction unit 38a, together with the image signal. The light-emission-prohibition signal generation circuit 384a can thus acquire the information on the sheet width of the recording medium P. Likewise, in the other examples, the circuit can acquire the information. Here, the sheet width is the length of the recording medium P in a direction (main scanning direction) orthogonal to the conveyance direction of the recording medium P. The sheet length is the length of the recording medium P in the conveyance direction (sub-scanning direction) of the recording medium P. The non-image-area exposure region is thus determined. The non-image-area exposure is performed in the region of the photosensitive member wider than the sheet size, thereby preventing fogging from occurring in sheet edge areas as described above. The light-emission-prohibition regions at the respective edges are about 3 mm with respect to the edges in consideration of variation in sheet conveyance characteristics.

The second selector 385a generates the non-image-area exposing data F based on the input non-image-area exposing signal D and light-emission-prohibition signal E. As illustrated in FIG. 3B, when the second selector 385a detects the off signal of the light-emission-prohibition signal E, this selector generates and outputs the non-image-area exposing data F as the off signal irrespective of the value of the non-image-area exposing signal D. Meanwhile, when the light-emission-prohibition signal E is not the off signal, the second selector 385a outputs the non-image-area exposing signal D as the non-image-area exposing data F. The non-image-area exposing signal D is a weak light emission data that does not allow toner to adhere, and determined by the non-image-area exposing data setting circuit 388a. In this case, for instance, a value of 16 is uniformly generated. Regions where the non-image exposure data F is not the off signal (regions with 16) are the non-image-area exposure regions. Regions with the off signal are the light-emission-prohibition regions.

The non-image-area exposing data setting circuit 388a sets the value of the weak light emission data that does not allow toner to adhere to the surface of the photosensitive drum 1a. For instance, in this embodiment, a value of 16 is set. The non-image-area exposing data setting circuit 388a outputs a set value, for instance, a value of 16 to an image signal level detection circuit 386a and the non-image-area exposing signal generation circuit 383a.

The image-area exposing data C for normal light emission, the non-image-area exposing data F for weak light emission, and the an output signal SEL from the image signal level detection circuit 386a are input into an input end of the third selector 387a. The image-area exposing data C and, for instance, a value of 16 output from the non-image-area exposing data setting circuit 388a are input into the image signal level detection circuit 386a. The image signal level detection circuit 386a detects whether the image-area exposing data C is equal to or less than a value, e.g. 16, (including off) input from the non-image-area exposing data setting circuit 388a or not. When the image signal level detection circuit 386a detects that the image-area exposing data C is equal to or less than 16 (including off), this circuit outputs, for instance, a low level signal as an SEL signal (see FIG. 3C). Meanwhile, when the image signal level detection circuit 386a detects that the image-area exposing data C is larger than 16, i.e. at least 17, this circuit outputs, for instance, a high level signal as the SEL signal (see FIG. 3C). In the SEL signal output from the image signal level detection circuit 386a, the high and low levels may be reversed. Instead, the signal may be any of values, such as 1 and 0. Only if the image-area exposing data C can represent two states, which are a state with 16 or less (including off) and a state with at least 17, the data is not limited to that in this embodiment.

The image-area exposing data C, the non-image-area exposing data F and the SEL signal are input into the third selector 387a, which outputs the output data G. Here, when the input non-image-area exposing data F is the off signal, the third selector 387a outputs the off signal as the output data G (see FIG. 3C). Meanwhile, when the input non-image-area exposing data F is not the off signal, the third selector 387a operates according to the input SEL signal, as follows. That is, when the SEL signal is at the low level, the third selector 387a outputs the non-image-area exposing data F as the output data G. Meanwhile, when the SEL signal is at the high level, the third selector 387a outputs the image-area exposing data C as the output data G.

The SEL signal is thus input from the image signal level detection circuit 386a into the third selector 387a, whereby the third selector 387a operates as follows. That is, when the image-area exposing data C is at a level equal to or less than a value of 16 set by the non-image-area exposing data setting circuit 388a, the non-image-area exposing data F (16 in this case) is output as the output data G of the third selector 387a.

Weak light emission is then performed by the exposing device 3a. Meanwhile, when the image-area exposing data C is at a level of a value of 17 or higher, the image-area exposing data C, as it is, is output as the output data G of the third selector 387a. Accordingly, the exposing device 3a emits normal light. When the third selector 387a detects the off signal indicating the print-prohibition region of the image-area exposing data C and the off signal indicating the light-emission-prohibition region of the non-image-area exposing data F, this selector outputs the off signal, as it is, as the output data G (see FIG. 3C). That is, when both the image-area exposing data C and the non-image-area exposing data F are the off signal, the third selector 387a outputs the off signal as the output data G.

Meanwhile, when the third selector 387a detects the off signal indicating the print-prohibition region of the image-area exposing data C and the signal (i.e., 16) other than the off signal of the non-image-area exposing data F, this selector outputs the non-image exposure data F (16), as it is, as the output data G. As described above, the output data G can be generated that can perform non-image-area exposure on the printable region of the image-area exposing data C, i.e., a region larger than the image-area exposure region. That is, the non-image-area exposure region can be larger than the image-area exposure region.

In this embodiment, for instance, when a A4-sized sheet (210 mm×297 mm) is designated, the printable region is 204 mm×291 mm and the non-image-area exposure region is 216 mm×303 mm, which is 3-mm widened with respect to the sheet edge in consideration of variation in sheet conveyance characteristics.

Operation of this Embodiment

This embodiment is principally characterized in that, in the rotational axis direction of the photosensitive drum 1, on the surface of the photosensitive drum 1, the width of the non-image-area exposure region on the photosensitive drum 1 in which weak light emission is performed is larger than the width of the region corresponding to the sheet on which an image is formed with the photosensitive drum 1, and, in the main scanning direction, the width of the non-image-area exposure region is included in the width of the charged region. The characteristics can shorten the laser light emission time while suppressing occurrence of fogging in the sheet edge area, in comparison with the case of weak light emission on the entire charged region. The operation of this embodiment will be described using FIGS. 10B, 4 and 5.

Figure 10A:
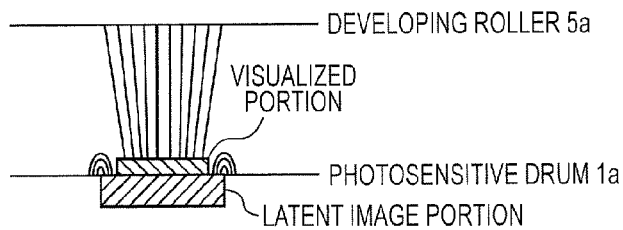
FIG. 10A is a diagram illustrating a white gap.
Figure 10B:
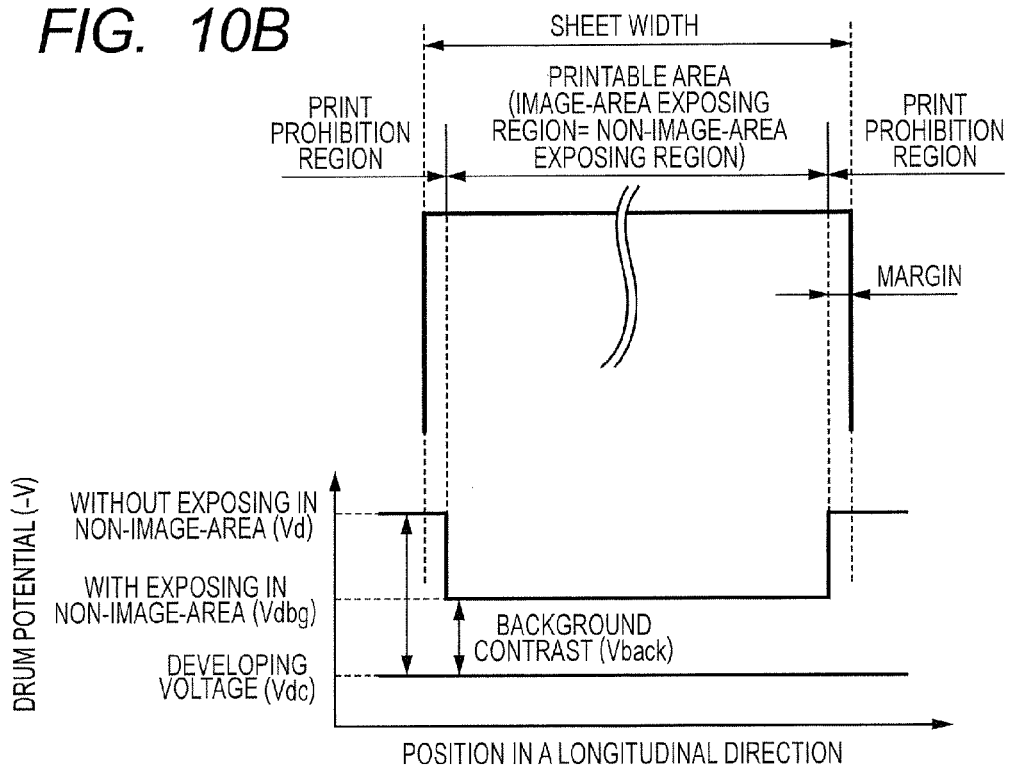
FIG. 10B is a diagram illustrating a non-image-area exposure region.
Figure 10C:
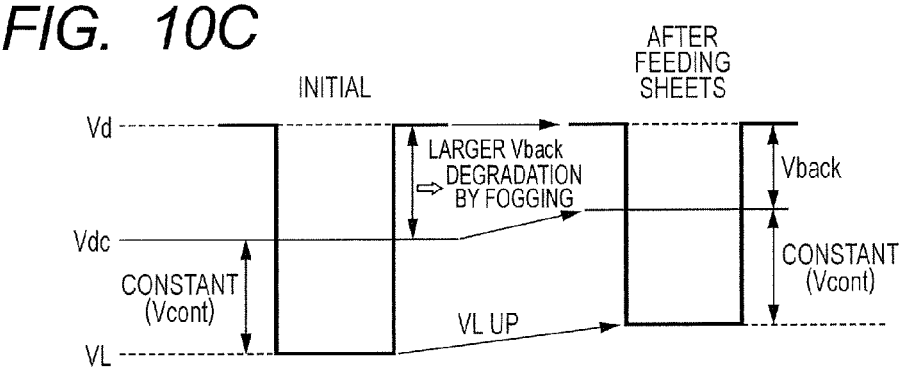
FIG. 10C is a diagram illustrating variation in exposure area voltage.

As illustrated in FIG. 10B, in the conventional configuration, the printable region is the same as the non-image-area exposure region, and the charged voltage (Vd) in the print-prohibition region of the photosensitive drum 1 (may hereinafter be called a photosensitive drum voltage) is, for instance, −550 V. Meanwhile, the charged voltage (Vdbg) in the non-image-area exposure region (=in the printable region) of the photosensitive drum 1 is changed from −550 V to, e.g., −450 V owing to weak light emission of background exposure. The photosensitive drum voltage is reduced in absolute value (|−550|>|−450|). The developing voltage (Vdc) is, for instance, −300 V. At this time, the background contrast Vback (=|Vd|−|Vdc| or |Vdbg|−|Vdc|), which is the contrast between the photosensitive drum voltage (Vd, Vdbg) and the developing voltage (Vdc), is 250 V in the print-prohibition region and 150 V in the non-image-area exposure region. In the print-prohibition region with a large background contrast, fogging tends to occur more widely. The description will be made later in detail.

Figure 4:
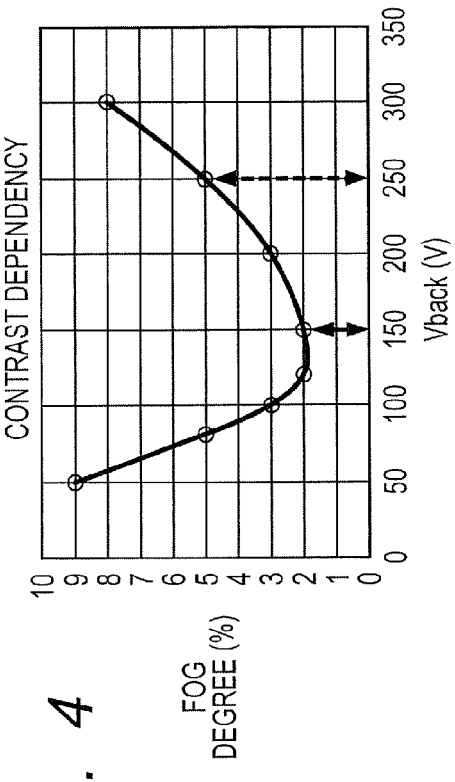
FIG. 4 is a diagram illustrating the relationship between fogging and background contrast of Embodiment 1.

FIG. 4 is a graph representing fogging to background contrast dependency where the abscissa is the background contrast Vback(V) and the ordinate is the fogging value (%). The fogging value can be acquired, for instance, by calculating a difference between the reflection density of the recording medium P without fogging and the reflection density of the recording medium P with fogging. When the fogging value is 0%, the state is without fogging. The larger the fogging value, the more widely fogging occurs. As illustrated in the graph of FIG. 4, the value of the background contrast is largely correlated with the fogging value. When the background contrast is low, the contrast between the developing voltage (Vdc) and the dark voltage (Vd) is small, and certain fogging called normal fogging tends to increase owing to reduction in electric field that accumulates toner on a side of the developing roller. For instance, when the background contrast is 50 V, fogging is 9%.

Meanwhile, when the background contrast is high, the contrast between the developing voltage (Vdc) and the dark voltage (Vd) is high. Accordingly, the voltage difference between the developing voltage (Vdc) and the dark voltage (Vd) unfortunately becomes high. Thus, there is a tendency where toner with the reversed polarity (the positive polarity in this case) flies to the side of the photosensitive drum to increase the fogging, which is the reversed fogging described above. For instance, when the background contrast is 250 V, fogging is 5% (the broken line arrow in the diagram). According to the conventional configuration, the reversed fogging occurred in the print-prohibition region (background contrast 250V) illustrated in FIG. 10B thus adheres to margins at sheet edges, thereby degrading the printing quality of the image.

Figure 5:
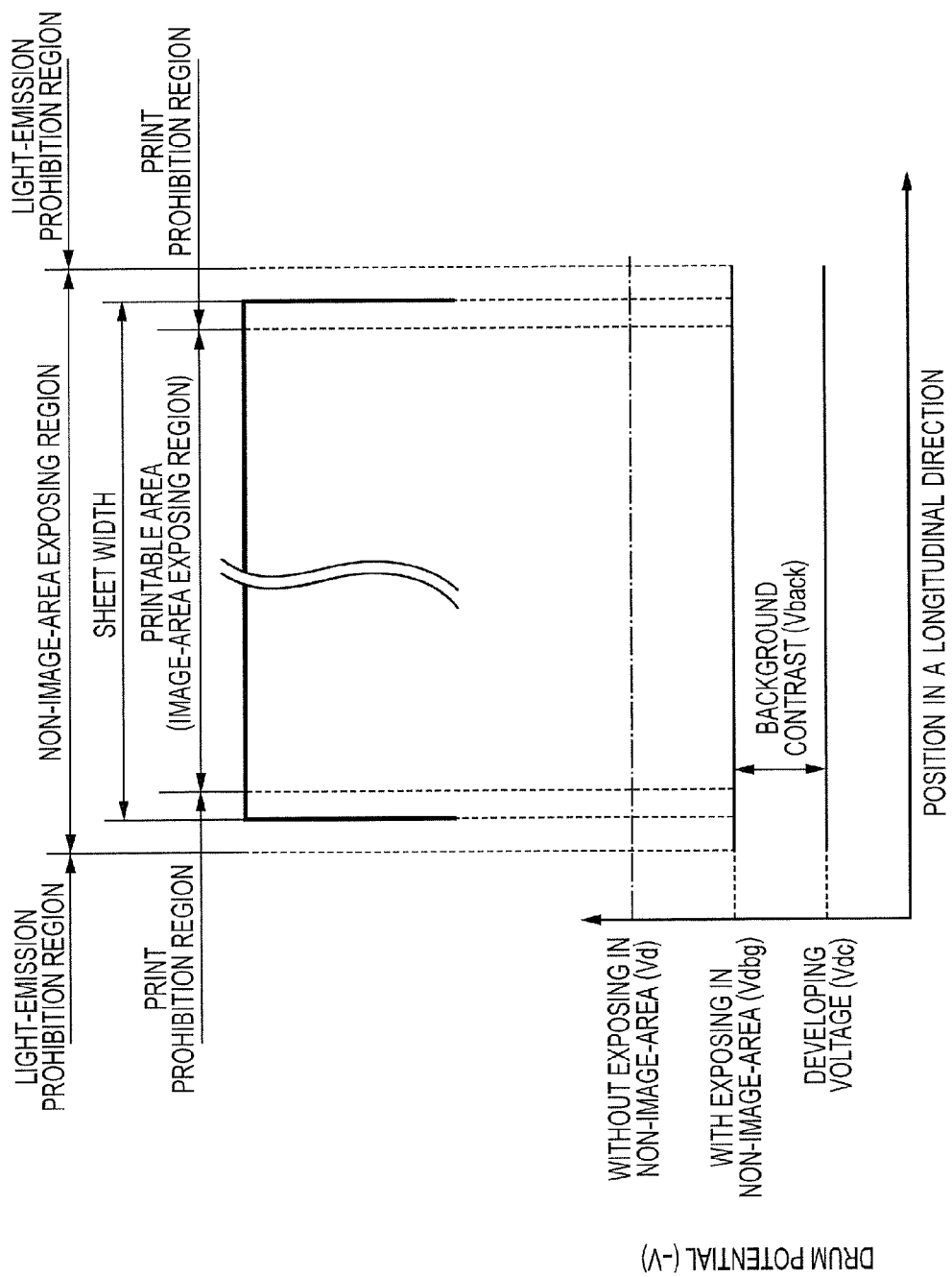
FIG. 5 is a diagram illustrating the non-image-area exposure of Embodiment 1.
Figure 6:
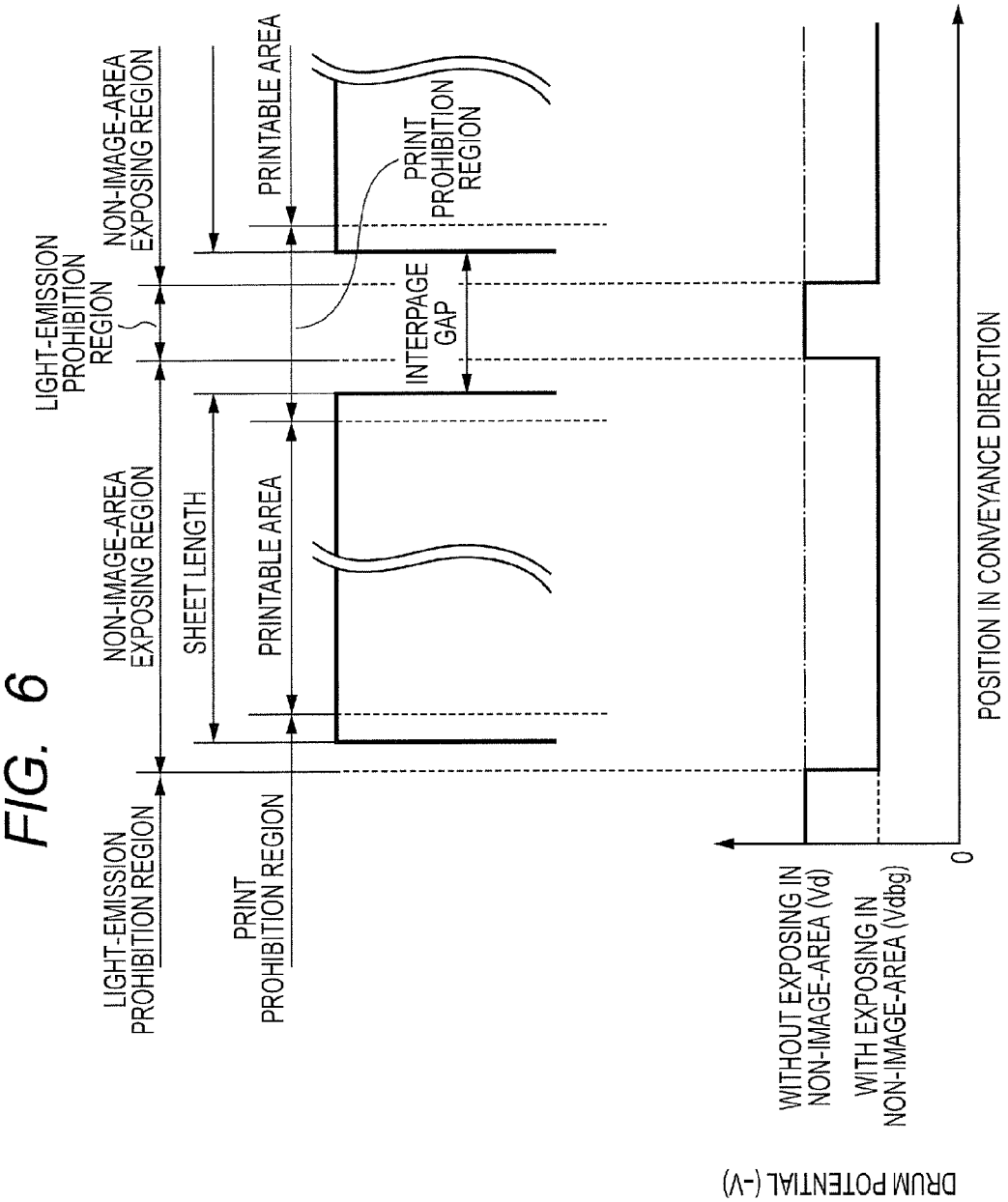
FIG. 6 is a diagram illustrating the non-image-area exposure of Embodiment 1.

Meanwhile, according to the configuration of this embodiment, as illustrated in FIG. 5, on the surface of the photosensitive drum 1, in the rotational axis direction of the photosensitive drum 1, the region in which non-image-area exposure is performed (non-image-area exposure region) is wider (larger) than the image-area exposure region (printable region) (normal light exposure region) and wider (larger) than the sheet width. Thus, in this embodiment, the background contrast is an appropriate value of 150 V in the entire region of the sheet. Accordingly, occurrence of fogging in the sheet edge area can be suppressed. That is, in this embodiment, according to the graph of FIG. 4, fogging corresponding to the background contrast of 150 V is 2% (solid line double pointed arrow). The fogging can thus be suppressed in comparison with the conventional technique (broken line double pointed arrow). In this embodiment, the operation in the sheet width direction, which is the main scanning direction (the rotational axis direction of the photosensitive drum 1) has been described. As illustrated in FIG. 6, light-emission-prohibition regions are also set in the sheet conveying direction, which is the sub-scanning direction (the direction orthogonal to the rotational axis of the photosensitive drum 1). Accordingly, analogous advantageous effects can be acquired. More specifically, on the surface of the photosensitive drum 1, the non-image-area exposure region in the sub-scanning direction is set longer than the printable region in the sub-scanning direction and longer than the sheet length. Accordingly, occurrence of fogging at the leading edge of the sheet and the trailing edge of the sheet can be suppressed.

As described above, according to this embodiment, on the surface of the photosensitive drum 1, the region in which the exposing device is caused to emit weak light to perform non-image-area exposure is set wider than the size of the recording medium but to be within the width of the charged region. Accordingly, the laser light emission time can be reduced while the photosensitive drum voltage in the entire sheet region including the print-prohibition region is maintained uniform. Thus, favorable image quality without occurrence of fogging in the sheet edge areas can be provided. In this embodiment, as the method of non-image-area exposure, the method of pulse width modulation according to the image signal has been described. However, this embodiment is not limited thereto. For instance, analogous advantageous effects can be exerted even with an analog non-image-area exposure system that controls the laser driver to be driven by slight current, thereby causing the laser diode to emit weak light.

As described above, according to this embodiment, occurrence of fogging at the sheet edge area can be suppressed while the laser light emission time is reduced.

Embodiment 2

As to the configurational elements of the image forming apparatus applied to Embodiment 2 that are analogous to those of Embodiment 1, the same components are assigned with the same symbols. The description thereof is omitted.

Characteristics of this Embodiment

This embodiment is principally characterized in that the non-image-area exposure region in which weak light emission is performed is within the width of the charged region in the main scanning direction but wider than the maximum width of the sheet possible to feed (maximum width) irrespective of the sheet size. That is, this embodiment is characterized in that the non-image-area exposure region is wider than the sheet size (the sheet length in the case of the sub-scanning direction) of the recording medium (prescribed recording medium) with the maximum size (maximum width) among recording media on which an image can be formed by the image forming apparatus of this embodiment. The control of non-image-area exposure is analogous to that of Embodiment 1. Accordingly, the description thereof is omitted. This embodiment will hereinafter be described more specifically.

According to the configuration of Embodiment 1, when a small size sheet is fed, fogging toner is not transferred onto the sheet but is transferred onto the parts other than the non-image-area exposure region (in the main scanning direction) of the intermediate transfer belt 10. A part of the fogging toner adheres to the secondary transfer roller 20, causing a possibility that, when a large size sheet is fed after the adhesion, toner stain is formed on the back side of the sheet. Thus, this embodiment has an object to set the region in which non-image-area exposure is performed wider than the maximum width of the sheet possible to feed, thereby suppressing toner stain on the back side of the sheet.

More specifically, for instance, in the case where the maximum width of the sheet possible to feed (maximum width) of the image forming apparatus of this embodiment is 216 mm equivalent to LTR size, the non-image-area exposure region is set to be 222 mm, in which each edge area is widened by 3 mm in consideration of variation of sheet conveyance characteristics. At this time, even in the case of feeding any of A4-sized and B5-sized sheets with a smaller width than that of the LTR size, the non-image-area exposure region is set to be 222 mm, which is in conformity with the maximum width of the sheet possible to feed.

Operation of this Embodiment

The operation of this embodiment is basically analogous to that of Embodiment 1. However, in this embodiment, the light-emission-prohibition signal generation circuit 384a in FIG. 2B generates the light-emission-prohibition signal E such that the light-emission-prohibition region is in conformity with the maximum width of the sheet possible to feed in the main scanning direction. Sheet size information of a recording medium that has the maximum size and can be fed in the image forming apparatus is preliminarily stored in, for instance, a memory, not illustrated. In this embodiment, the region to be subjected to non-image-area exposure where the exposing device is caused to emit weak light is widened more than the maximum width of the sheet possible to feed. Accordingly, the photosensitive drum voltage can be made uniform over the entire maximum width of the sheet possible to feed. Furthermore, the fogging toner can be prevented from transferred onto the intermediate transfer belt in the maximum width of the sheet possible to feed. Thus, favorable image quality without causing toner stains on the back side of a sheet, which occurs when a large size sheet is fed after a small size sheet is fed, can be provided. This embodiment is also applicable to the conveyance direction (sub-scanning direction) of the recording medium P.

As described above, this embodiment can suppress occurrence of fogging in the sheet edge area while reducing the laser light emission time.

Embodiment 3

As to the configurational elements of the image forming apparatus adopted in this embodiment that are analogous to those of Embodiment 1, the same components are assigned with the same symbols. The description thereof is omitted.

Characteristics of this Embodiment

This embodiment is principally characterized in that control of non-image-area exposure is also performed in light-emission-prohibition regions, such as interpage gaps. Control of non-image-area exposure is analogous to Embodiments 1 and 2. Accordingly, the description is omitted. Here, in a state where, provided that there are a preceding sheet (first recording medium) conveyed previously and a subsequent sheet (second recording medium) conveyed after the preceding sheet and thus the plural recording media are sequentially conveyed, the interpage gap indicates an interval between the trailing edge of the preceding sheet and the leading edge of the subsequent sheet. This embodiment will hereinafter be described more specifically using FIGS. 7 and 8.

Figure 7:
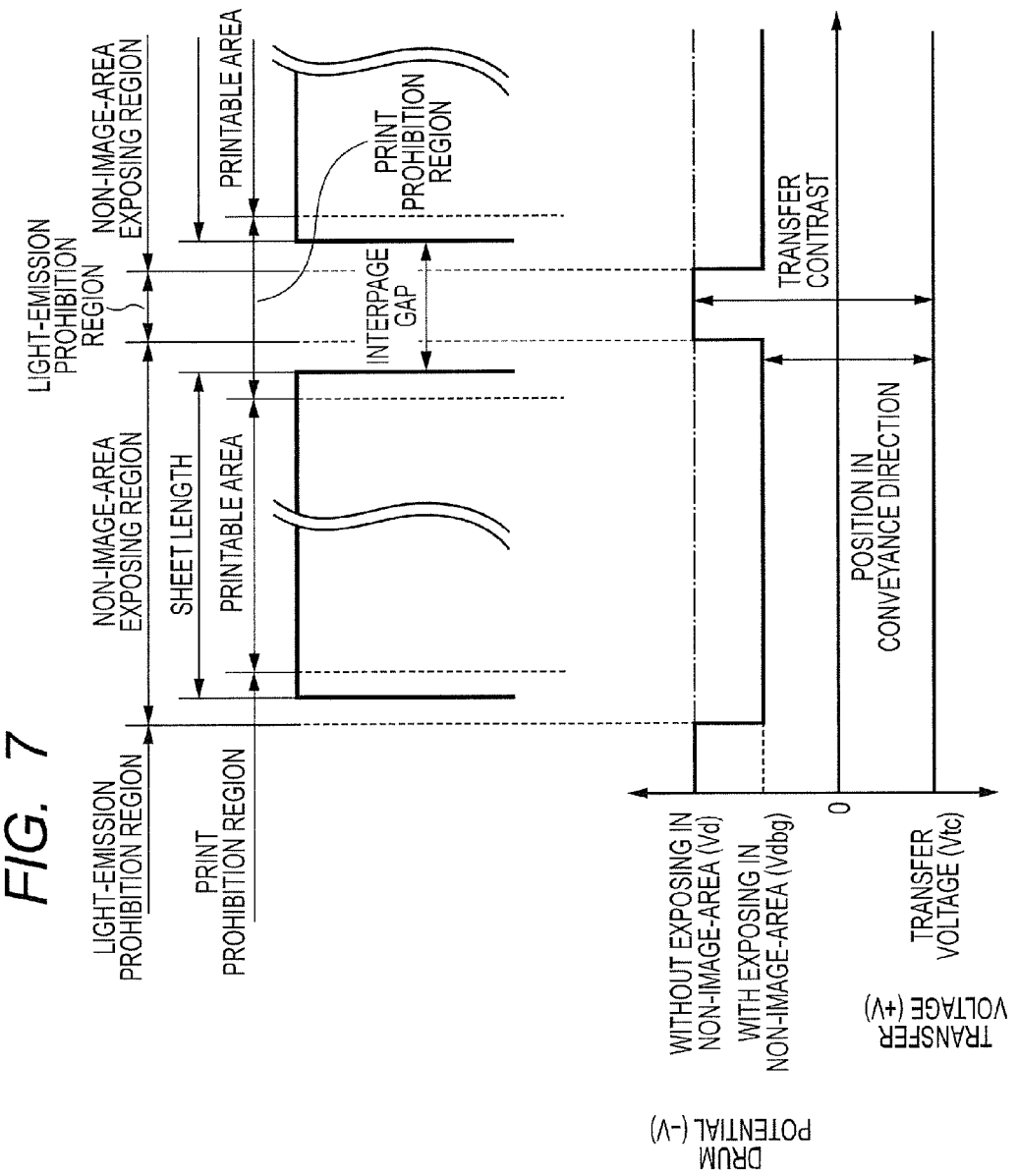
FIG. 7 is a diagram illustrating non-image-area exposure of Embodiment 3.

In the configuration of Embodiment 1, as illustrated in FIG. 7, in the region corresponding to the interpage gap in sequential printing on the photosensitive drum 1 (region between recording media), the photosensitive drum voltage (Vd) becomes higher than that of the image forming unit performing non-image-area exposure. Accordingly, the contrast with the primary transfer voltage becomes too high. The high contrast makes charged voltage on the next image forming nonuniform, which causes a possibility of occurrence of a ghost. This embodiment has thus an object to perform non-image-area exposure also in the region of the photosensitive drum 1 corresponding to the interpage gap, thereby suppressing a ghost, which occurs owing to the difference between the voltage in region in the non-image area of the photosensitive drum 1 where exposure is performed and the voltage in the region where exposure is not performed.

More specifically, as to the image area, the primary transfer voltage is set to a voltage necessary to transfer the toner image formed on the bright voltage (VL) area on the photosensitive drum 1a onto the intermediate transfer belt 10. Meanwhile, as to the non-image area without toner on the photosensitive drum 1a, the contrast between the dark voltage (Vd) and the primary transfer voltage is too high and is thus required to set in an extent where discharge at the primary transfer nip is not too high. Too high discharge excessively reduces the voltage on the photosensitive drum after passing through the transfer nip. Accordingly, the voltage cannot be increased to a desired dark voltage on the next charging. The drum voltage becomes nonuniform between the image area and the non-image area. The nonuniformity causes an image failure called a ghost appearing as variation in density on the next image. Accordingly, the primary transfer voltage is required to be set in an appropriate range. In this embodiment, the primary transfer voltage (Vtc) in image forming is, for instance, +500 V.

Here, the primary transfer roller 14a includes a nickel-plated steel rod with an outer diameter of 6 mm, and NBR foam sponge adjusted to have a volume resistivity of $10^8$ Ω·cm and a thickness of 3 mm that covers the rod; this roller has an outer diameter of 12 mm. The primary transfer roller 14a is pressed against and in contact with the intermediate transfer belt 10 at a pressure of 5 N, and rotates following the intermediate transfer belt 10.

Figure 8:
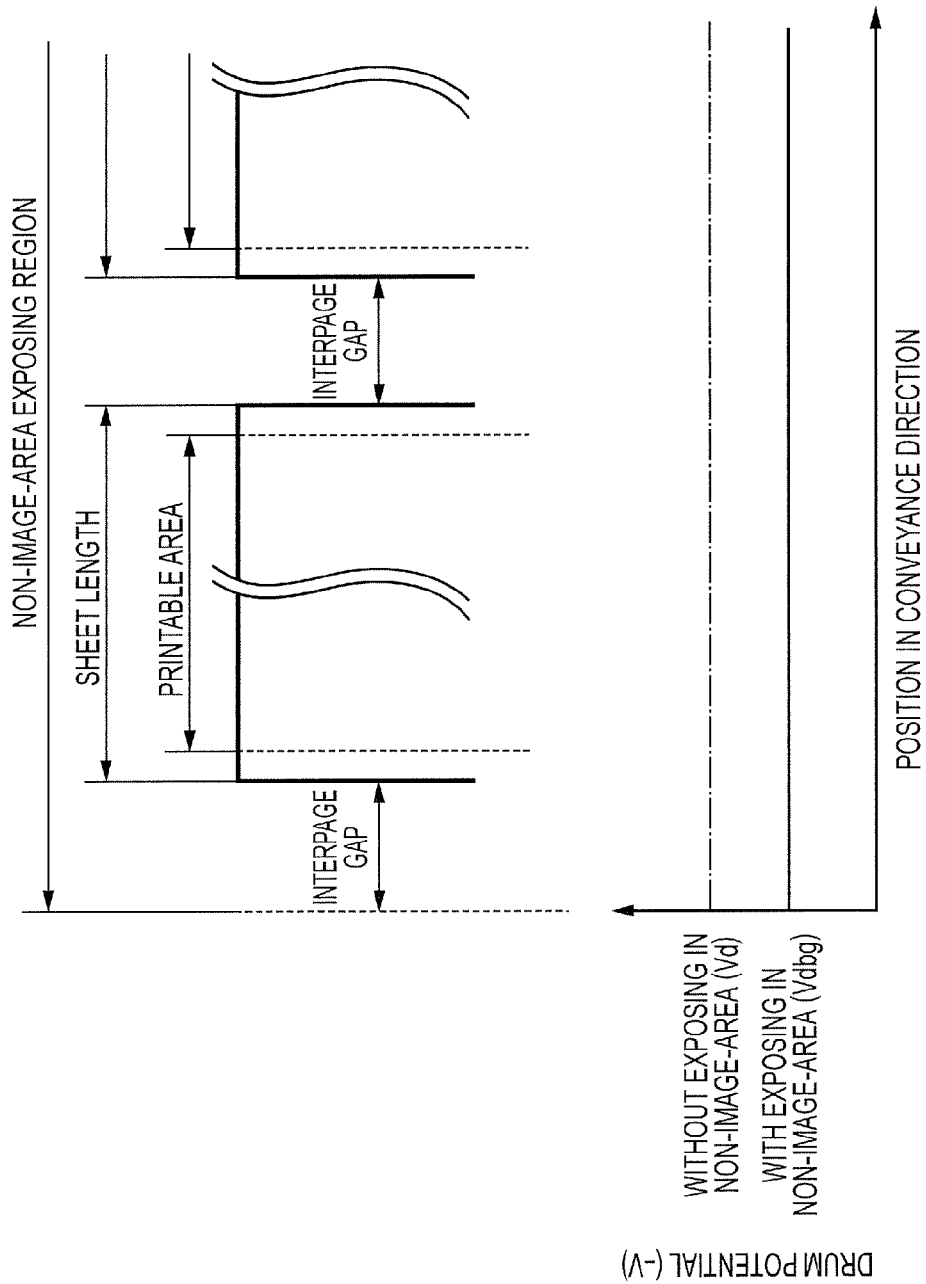
FIG. 8 is a diagram illustrating the non-image-area exposure of Embodiment 3.

As described above, in this embodiment, as illustrated in FIG. 8, control is performed so as to perform the non-image-area exposure also at the interpage gap in sequential printing. Accordingly, occurrence of a ghost can be suppressed. That is, in this embodiment, the light-emission-prohibition region in the interpage gap as illustrated in FIG. 7 is not provided. Instead, as illustrated in FIG. 8, the entire region in the sub-scanning direction during sequential printing is regarded as the non-image-area exposure region. More specifically, the light-emission-prohibition signal generation circuit 384a in FIG. 2 does not turn off the light-emission-prohibition signal E in the sub-scanning direction. The control of the non-image-area exposure in the sheet width direction is analogous to that of Embodiments 1 and 2.

Operation of this Embodiment

Next, the operation of this embodiment will be described using FIGS. 7 and 8. As illustrated in FIG. 7, according to the configuration of determining the non-image-area exposure region according to the sheet size of Embodiment 1, non-image-area exposure is not performed in the interpage gap, and the charged voltage (Vd) of the photosensitive drum is, for instance, −550 V. Meanwhile, the photosensitive drum voltage (Vdbg) of the non-image-area exposure region (in the sheet) is changed from −550 V to, e.g., −450 V owing to weak light emission of non-image-area exposure; the drum voltage is reduced in absolute value. The transfer voltage (Vtc) is, for instance, +500 V. At this time, the transfer contrast (=Vtc−Vd, =Vtc−Vdbg), which is the contrast between the photosensitive drum voltage (Vd, Vdbg) and the transfer voltage (Vtc), is 1050 V in the interpage gap and 950 V in the non-image-area exposure region. Accordingly, as described above, in the interpage gap with a large transfer contrast, discharge is too high, thereby causing a tendency of occurrence of a ghost.

Meanwhile, as illustrated in FIG. 8, in the configuration of this embodiment, the region in which non-image-area exposure is performed is the region including the interpage gap. Accordingly, the transfer contrast is an appropriate value of 950 V also in the interpage gap, which can suppress occurrence of a ghost. The control of non-image-area exposure in the sheet width direction is analogous to that of Embodiments 1 and 2. Accordingly, the description is omitted.

As described above, according to this embodiment, control is performed such that non-image-area exposure of causing the exposing device to emit weak light is performed also in the interpage gap during sequential printing. Accordingly, the photosensitive drum voltage in the region including the interpage gap can be uniform. Thus, favorable image quality without occurrence of a ghost can be provided.

In this embodiment, the control of non-image-area exposure in the interpage gap in sequential printing has been described as an example. However, advantageous effects of the present invention are not limited to those on the interpage gap. For instance, even in the cases of forward rotation (print preparatory operation) and reverse rotation (operation of finishing printing), analogous advantageous effects can be exerted.

As described above, according to this embodiment, occurrence of fogging in the sheet edge area can be suppressed while the laser light emission time is reduced.

Embodiment 4

As to the configurational elements of the image forming apparatus adopted in this embodiment that are analogous to those of Embodiment 1, the same components are assigned with the same symbols. The description thereof is omitted.

Characteristics of this Embodiment

This embodiment is principally characterized in that the transfer voltage in sequential printing is controlled such that the transfer contrast of primary transfer is maintained constant compensating the values of the photosensitive drum voltage (Vd) and the non-image-area exposure voltage (Vdbg). The control of non-image-area exposure and the configuration of the transfer unit are analogous to those of Embodiment 3. Accordingly, the description is omitted. This embodiment will be described more specifically using FIG. 9.

Figure 9:
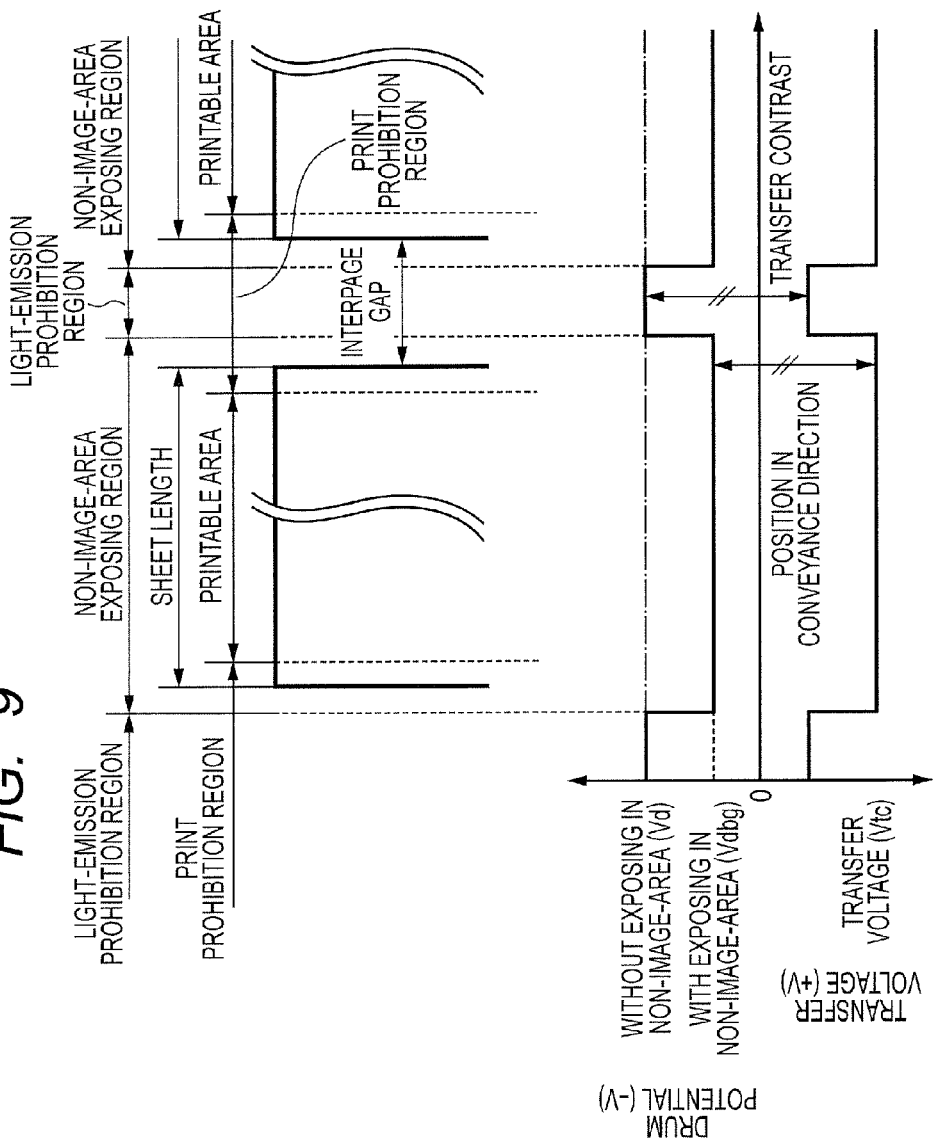
FIG. 9 is a diagram illustrating non-image-area exposure of Embodiment 4.

In the configuration of Embodiment 3, the object is to perform non-image-area exposure also in the interpage gap, thereby suppressing occurrence of a ghost. However, non-image-area exposure also in the interpage gap causes the laser to always emit light. Accordingly, the life of the laser may be reduced. Thus, in this embodiment, the voltage of primary transfer is controlled to be changed between the region subjected to exposure and the region not subjected to exposure in the non-image area in the interpage gap in sequential printing. The object is to control the voltage of primary transfer to change, thereby suppressing occurrence of a ghost while maintaining the life of the laser. More specifically, as illustrated in FIG. 9, in the case where the region not subjected to exposure in the non-image area among the regions on the surface of the photosensitive drum 1 corresponding to the interpage gap is at the primary transfer nip, the transfer voltage (Vtc) corresponding to the difference (=|Vd|−|Vdbg|) between the region subjected to exposure in the non-image area and the region not subjected to exposure in the non-image area on the photosensitive drum is reduced (=Vtc−|Vd|−|Vdbg|). Accordingly, irrespective of presence or absence of non-image-area exposure, the transfer contrast (=Vtc−Vd, =Vtc−Vdbg) is controlled to be always constant in the interpage gap.

Operation of this Embodiment

Next, an operation of this embodiment will be described using FIG. 9. As illustrated in FIG. 9, in the configuration of Embodiment 1, the charged voltage (Vd) in the region not subjected to non-image-area exposure among the regions on the surface of the photosensitive drum 1 corresponding to interpage gaps is, for instance, −550 V. Meanwhile, the photosensitive drum voltage (Vdbg) of a portion corresponding to the region subjected to non-image-area exposure is increased in drum voltage from, for instance, −550 V to −450 V by weak light emission of non-image-area exposure. The transfer voltage (Vtc) is, for instance, +500 V in the non-image-area exposure region. As described above, in this embodiment, +400 (=+500−100)V, which is a value reduced by the difference between the voltage in the region subjected to exposure in non-image area on the photosensitive drum and the voltage in the region not subjected to exposure in the non-image area on the photosensitive drum, is applied to the region on the surface of the photosensitive drum 1 corresponding to the interpage gap. Accordingly, the transfer contrast (=Vtc−Vd, =Vtc−Vdbg), which is the contrast between the photosensitive drum voltage (Vd, Vdbg) and the transfer voltage (Vtc), is 950 V in the entire region including the interpage gap, thereby allowing occurrence of ghost to be suppressed.

An engine controller, not illustrated, performs control such that the transfer voltage is switched from +500 V to +400 V or from +400 V to +500 V. The timing when the engine controller switches the transfer voltage is determined based on, for instance, the sheet length of the recording medium P. As illustrated in Embodiment 1, the light-emission-prohibition region is, for instance, about 3 mm from the trailing edge of the preceding sheet or the leading edge of the subsequent sheet, in consideration of variation in sheet conveyance characteristics. For instance, information on the light-emission-prohibition region is input into the engine controller from the data correction unit 38a. A configuration may be adopted where the engine controller switches the transfer voltage based on the information.

As described above, according to this embodiment, the transfer voltage in sequential printing is controlled such that the transfer contrast of the primary transfer is maintained constant compensating the values of the photosensitive drum voltage (Vd) and the non-image-area exposure voltage (Vdbg). Accordingly, in this embodiment, favorable image quality without occurrence of a ghost can be provided.

In this embodiment, the transfer control in the interpage gap in sequential printing has been described as an example. The advantageous effects of the present invention are not limited to those at interpage gap. For instance, even in the cases of forward rotation (print preparatory operation) and reverse rotation (operation of finishing printing), analogous advantageous effects can be exerted.

In this embodiment, as an example, the transfer control has been described that changes the voltage applied to the transfer roller such that, in the non-image area, the voltage that is applied to the transfer roller corresponding to the region subjected to exposure is different from the voltage that is applied to the transfer roller corresponding to the region not subjected to exposure. However, the advantageous effects of the present invention are not limited to those on the transfer control. Instead, the analogous advantageous effects can be acquired even if a method is employed that controls the photosensitive drum voltage to be maintained constant by changing the voltage applied to the charging roller such that, for instance, in the non-image area the voltage applied to the charging roller corresponding to the region subjected to exposure is different from the voltage applied to the charging roller corresponding to the region not subjected to exposure, to maintain the transfer contrast to be constant.

As described above, according to this embodiment, occurrence of fogging is suppressed in the sheet edge areas while the laser light emission time is reduced.

Other Embodiments

In the above embodiments, the case where the relationship "printable region<sheet width (sheet length)<non-image-area exposure region" holds has been described. However, for instance, the present invention is applicable to the case where "sheet width (sheet length) <printable region<non-image-area exposure region", such as printing without margin, holds.

In the above embodiment, the configuration is adopted where the primary transfer transfers the toner image onto the intermediate transfer belt 10, and the secondary transfer transfers the toner image on the intermediate transfer belt 10 onto the recording medium P. However, the present invention is applicable to a color image forming apparatus that employs a method of sequentially transferring single-colored images on the respective photosensitive drums in an overlapping manner onto a recording medium conveyed on the conveyance belt.

In the above embodiments, the description has been made using the color image forming apparatus. However, the technique is also applicable to an image forming apparatus forming a monochrome image.

As described above, also in the other embodiments, occurrence of fogging can be suppressed while the laser light emission time is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-050672, filed Mar. 7, 2012 and No. 2013-037362, filed on Feb. 27, 2013, which are hereby incorporated by reference herein in their entirety.

What is claimed is:

1. An image forming apparatus that forms a latent image by exposing a photosensitive member charged by a charging device and that develops the latent image with toner to form a toner image on a recording medium, comprising:
a light emitting device that emits normal light onto a printable region on the photosensitive member charged by the charging device to form the latent image; and
a control unit configured to cause the light emitting device to emit weak light whose light amount is smaller than a light amount of the normal light,
wherein with regard to the rotational axis direction of the photosensitive member, the control unit causes the light emitting device to emit weak light onto a weak light onto a weak light exposure region on the photosensitive member outside the printable region in a region corresponding to the recording medium on the photosensitive member,
wherein with regard to the rotational axis direction, both outer borders of the weak light exposure region on the photosensitive member are respectively positioned outside both outer borders of the region corresponding to the recording medium on the photosensitive member and inside both outer borders of a charging region charged by the charging device on the photosensitive member, and
wherein with regard to the rotational axis direction, a region on the photosensitive member inside the charging region and outside the weak light exposure region constitutes a light emission prohibition region in which light emission is prohibited.

2. An image forming apparatus according to claim 1, wherein with regard to the rotational axis direction of the photosensitive member, the outer borders of the weak light exposure region are positioned outside outer borders of a region corresponding to a maximum width recording medium on the photosensitive member, the maximum width recording medium having a maximum width in which an image can be formed.

3. An image forming apparatus according to claim 1, wherein the control unit causes the light emitting device to emit weak light onto the weak light exposure region outside the printable region in the region corresponding to the recording medium with regard to the conveyance direction of recording medium,
wherein both outer borders of the weak light exposure region with regard to the conveyance direction are respectively positioned outside both outer borders of the regions corresponding to the recording medium on the photosensitive member.

4. An image forming apparatus according to claim 3, wherein with regard to the conveyance direction, the outer borders of the weak light exposure region is positioned outside outer borders of the region corresponding to a maximum width recording medium on the photosensitive member, the maximum width recording medium having a maximum width in which an image can be formed.

5. An image forming apparatus according to claim 3, wherein in the conveyance direction, the weak light exposure region includes at least a part of a region of the photosensitive member, the region corresponding to an interval between a trailing edge of a first recording medium and a leading edge of a second recording medium conveyed subsequently to the first recording medium.

6. An image forming apparatus according to claim 5, further comprising a transfer device that transfers the toner image formed on the photosensitive member by applying a voltage and developing the latent image by the developing device, onto an intermediate transfer member or a recording medium,
wherein in the conveyance direction of the recording medium, a voltage applied to the transfer device at a position corresponding to the weak light exposure region is different from a voltage applied to the transfer device at a position corresponding to a region on the photosensitive member which is not the weak light exposure region.

7. An image forming apparatus according to claim 5, wherein the charging device is charged with a voltage to charge the photosensitive member,
wherein in the conveyance direction of the recording medium, a voltage applied to the charging device at a position corresponding to the weak light exposure region is different from a voltage applied to the charging device at a position corresponding to a region on the photosensitive member which is not the weak light exposure region.

8. An image forming apparatus according to claim 1, wherein the light emitting device comprises a light source capable of emitting light at a first light emission level for emitting normal light and at a second light emission level for emitting weak light.

9. An image forming apparatus according to claim 8, wherein a total light emission amount per unit time from the light source at the second light emission level is lower than a total light emission amount per unit time from the light source at the first light emission level.

10. An image forming apparatus according to claim 1, wherein a light amount of the normal light is an amount on which toner is to be adhered on the photosensitive member and a light amount of the weak light is an amount on which toner is not to be adhered on the photosensitive member.

11. An image forming apparatus that forms a latent image by exposing a photosensitive member charged by a charging device and that develops the latent image with toner to form a toner image on a recording medium, comprising:
a light emitting device that emits normal light onto a printable region on the photosensitive member charged by the charging device to form a latent image; and
a control unit configured to cause the light emitting device to emit weak light whose light amount is smaller than a light amount of the normal light,
wherein with regard to the conveyance direction of the recording medium, the control unit causes the light emitting device to emit weak light to a weak light exposure region on the photosensitive member outside the printable region in a region corresponding to the recording medium on the photosensitive member, and
wherein with regard to the conveyance direction of the recording medium, both outer borders of the weak light exposure region are respectively positioned outside both outer borders of the regions corresponding to the recording medium on the photosensitive member.

12. An image forming apparatus according to claim 11, wherein with regard to the conveyance direction of recording medium, the outer borders of the weak light exposure region are positioned outside outer borders of a region corresponding to a maximum width recording medium on the photosensitive member, the maximum width recording medium having a maximum width in which an image can be formed.

13. An image forming apparatus according to claim 11, wherein in the conveyance direction of the recording medium, the weak light exposure region includes at least a part of a region of the photosensitive member, the region corresponding to an interval between a trailing edge of a first recording medium and a leading edge of a second recording medium conveyed subsequently to the first recording medium.

14. An image forming apparatus according to claim 13, further comprising a transfer device that transfers the toner image formed on the photosensitive member by applying a voltage and developing the latent image by the developing device, onto an intermediate transfer member or a recording medium,
wherein in the conveyance direction of the recording medium, a voltage applied to the transfer device at a position corresponding to the weak light exposure region is different from a voltage applied to the transfer device at a position corresponding to a region on the photosensitive member which is not the weak light exposure region.

15. An image forming apparatus according to claim 13, wherein the charging device is charged with a voltage to charge the photosensitive member,
wherein in the conveyance direction of the recording medium, a voltage applied to the charging device at a position corresponding to the weak light exposure region is different from a voltage applied to the charging device at a position corresponding to a region on the photosensitive member which is not the weak light exposure region.

16. An image forming apparatus according to claim 11, wherein the light emitting device comprises a light source capable of emitting light at a first light emission level for emitting normal light and at a second light emission level for emitting weak light.

17. An image forming apparatus according to claim 16, wherein a total light emission amount per unit time from the light source at the second light emission level is lower than a total light emission amount per unit time from the light source at the first light emission level.

18. An image forming apparatus according to claim 11, wherein a light amount of the normal light is an amount on which toner is to be adhered on the photosensitive member and a light amount of the weak light is an amount on which toner is not to be adhered on the photosensitive member.

19. An image forming apparatus according to claim 11, wherein with regard to the conveyance direction of the recording medium, a region on the photosensitive member inside a charging region and outside the weak light exposure region constitutes a light emission prohibition region in which light emission is prohibited.

* * * * *